MULTILAYER THIN FILM MAGNETIC MEMORY ELEMENT

Original Filed Aug. 5, 1965

INVENTOR.
SOLOMON R. POLLACK
BY
Thomas F. Moran
ATTORNEY

United States Patent Office 3,525,023
Patented Aug. 18, 1970

3,525,023

MULTILAYER THIN FILM MAGNETIC MEMORY ELEMENT

Solomon R. Pollack, Philadelphia, Pa., assignor to Sperry Rand Corporation, New York, N.Y., a corporation of Delaware Continuation of application Ser. No. 477,436, Aug. 5, 1965. This application July 22, 1969, Ser. No. 846,651
Int. Cl. H01l 9/00
U.S. Cl. 317—234 6 Claims

ABSTRACT OF THE DISCLOSURE

A memory element made up of a semiconductor film sandwiched between two magnetic films. The two magnetic films differ from each other in their characteristic coercive force and have their easy axis of magnetization at a 90° angle to each other. When an electric potential is applied between the magnetic films such that the semiconductor film is made electrically conductive, the direction of the magnetization in the film having the lower value of characteristic coercive force tends to align itself with the direction of magnetization of the film having the higher value of characteristic coercive force and is thus rotated away from its original direction and away from the easy axis of magnetization. The electrical potential applied is such that the rotation is kept to about 60° from the original direction. When the electrical potential between the magnetic films is changed such that the semiconductor film is not electrically conductive, the direction of magnetization in the film having the lower value of characteristic coercive force returns to the easy axis of magnetization. This return induces an electromotive force in a sensor.

This is a continuation of Ser. No. 477,436 filed Aug. 5, 1965, now abandoned.

This invention relates to magnetic memory elements. More particularly, this invention relates to multilayer thin film magnetic memory elements. Still more particularly, this invention relates to variably coupled thin film multilayer magnetic memory elements.

It is known that when two uniaxial magnetic films are separated by a conducting film, parallel alignment of the magnetization of the two magnetic films results. This parallel coupling permits non-destructive read out when the two magnetic films have different $H_c$ (characteristic coercive force) values. It has also been observed that when an insulator is used as the intervening layer between two magnetic films a low creep magnetic memory element is obtained because the magnetostatic coupling reduces the need for cross tie walls. It has even been suggested that cross tie walls are the source of magnetic creep phenomena. It has also been suggested that multilayer thin film magnetic memory elements consisting of a conductor and insulator as intervening layers between two magnetic films may result in an effective and satisfactory compromise.

It is therefore an object of this invention to provide an improved multilayer magnetic film memory element.

Another object of this invention is to provide a multilayer magnetic film memory element possessing nondestructive read out capability.

Figure 1:
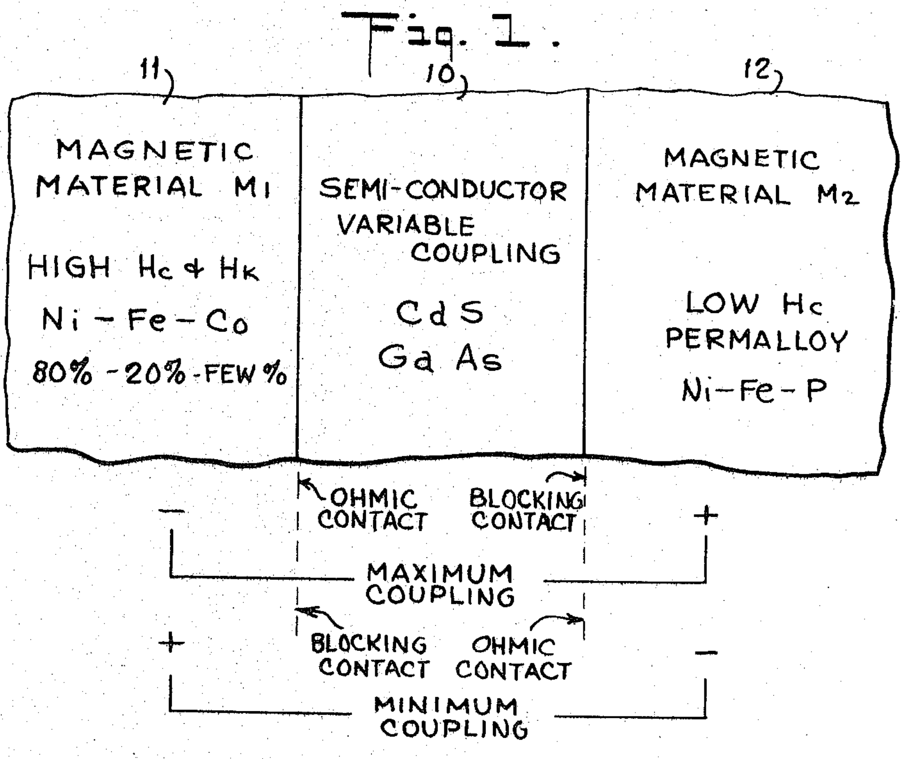
Figure 2:
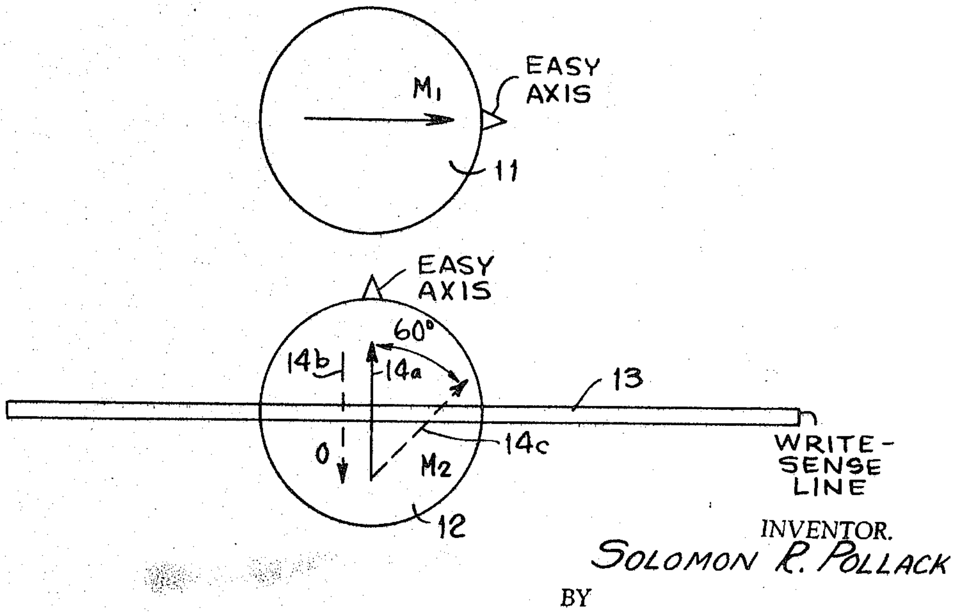

How these and other objects of this invention are aciheved will become apparent in the light of the accompanying disclosure made with reference to the accompanying drawings wherein FIG. 1 schematically illustrates the structure of a multilayer thin film magnetic memory element in accordance with this invention and wherein FIG. 2 illustrates the orientation of the magnetic films of FIG. 1 together with a write/sense line orientation. In at least one embodiment of this invention at least one of the foregoing objects will be achieved.

In accordance with this invention there is provided a thin film magnetic memory element having variably coupled magnetic films. Still more particularly in accordance with this invention there is provided a magnetic film memory element wherein the coupling between two magnetic films is capable of control or variation by means of a layer of semiconductor material capable of supporting a bias and interposed between the two magnetic films making up the element.

Referring now to the drawings which schematically illustrate an embodiment of this invention and wherein FIG. 1 indicates the disposition of the films in accordance with this invention to provide a multilayer thin film magnetic memory element and the manner in which the films may be biased in order to produce the desired coupling and wherein FIG. 2 shows the orientation of the films together with a write/sense line orientation, and with particular reference to FIG. 2, magnetic material $M_1$ identified by reference numeral 11 is positioned with its easy axis of magnetization in the horizontal direction as indicated. The other film of magnetic material $M_2$ identified by reference numeral 12 is positioned with its easy axis of magnetization perpendicular to the easy axis of magnetic material $M_1$. As illustrated, the write/sense line 13 is arranged along the hard axis of magnetic material $M_2$ and the easy axis of magnetic material $M_1$. A single line may be used on a shared time basis or, if desired, two separate lines having the same orientation may be employed. With particular reference to FIG. 1, magnetic material $M_1$ identified by reference numeral 11, referred to hereinabove, is preferably a material exhibiting a high $H_c$ and $H_k$ where $H_c$ is used to denote characteristic coercive force, and $H_k$ is used to denote the minimum transverse field required to switch a film element from one stable, remanent state to the other. A suitable such material would be a metal alloy containing nickel and iron, such as an alloy having the composition about 80% by weight nickel, about 20% by weight iron and about a few percent, e.g. 1–3% by weight cobalt.

The other thin film of magnetic material $M_2$ identified by reference numeral 12 is a magnetic material exhibiting a low $H_c$, such as a nickel-iron alloy, e.g. Permalloy, an alloy comprising nickel, iron and phosphorus.

Sandwiched between magnetic materials $M_1$ and $M_2$ is a layer of semiconductor material identified by reference numeral 10. The layer of semiconductor material 10 between the layers or films of magnetic materials $M_1$ and $M_2$ serves for effecting variable coupling between the films of magnetic materials $M_1$ and $M_2$. Desirably, semiconductor material 10 is made up of cadmium sulfide or gallium arsenide. Other semiconductor materials, identified hereinbelow, are also suitable.

For maximum coupling between metals $M_1$ and $M_2$ a voltage is applied such that metal film 11, made up of magnetic material $M_1$, is negative and metal film 12, is made up of magnetic material $M_2$, is positive. As illustrated in FIG. 1 at the interface between film 11 of magnetic material $M_1$ and semiconductor 10 the contact will be ohmic whereas the interface contact between film 12 of magnetic material $M_2$ and semiconductor 10 will be blocking. To achieve minimum coupling the polarity of the applied voltage is reversed so that film 11 of magnetic material $M_1$ is positive and film 12 of magnetic material $M_2$ is negative. When this condition is achieved by suitable means for applying bias to the magnetic films 11 and 12 and for reversing polarity, such means not being illustrated in the drawing, the interface contact between film 11 of magnetic material $M_1$ and semiconductor 10 will now be blocking and the interface contact between semiconductor 10 and film 12 of magnetic material $M_2$ will be ohmic.

The operation of the multilayer thin film magnetic memory element in accordance with this invention is substantially as follows: Referring to the drawings and particularly to FIG. 2 thereof, the magnetization vector in magnetic material $M_2$ may be set, as illustrated by lines 14*a* and 14*b*, in either of its two anti-parallel states, depending upon the polarity of the signal applied to the write/sense line.

With the films of magnetic materials $M_1$ and $M_2$ arranged as set forth in FIG. 1 minimum coupling bias is applied in order to permit read out and to change the coupling from a minimum state to a maximum state. A voltage of the polarity illustrated in FIG. 1 for maximum coupling is then applied between the films of magnetic materials $M_1$ and $M_2$ to cause maximum coupling between films 11 and 12 of magnetic materials $M_1$ and $M_2$, respectively. The only constraint or limitation upon the magnitude of the thus-applied voltage for maximum coupling is that it should be only sufficient to rotate the magnetic axis of magnetic material $M_2$ about 60° with respect to its uncoupled position, see line 14*c* of FIG. 2, i.e. the applied voltage should not be of a value sufficient to rotate magnetic material $M_2$ greater than 60° with respect to its uncoupled position. In the region of about 60° or less the removal of the thus-applied coupling voltage will permit magnetic material $M_2$ to restore to its original position. To exceed 60° and approach 90° will place the memory element in the non-restoring condition and prevent restoration. The rotation of magnetic material $M_2$ toward $M_1$ will produce in the write/sense line 13 voltage output the polarity of which will reflect the original orientation of magnetic material $M_2$ relative to magnetic material $M_1$, thereby indicating the value stored. When the maximum coupling voltage is removed and minimum coupling voltage reapplied to films 11 and 12 of magnetic materials $M_1$ and $M_2$, respectively, the magnetization vector in magnetic material $M_2$ will return to its original position.

Accordingly, as indicated hereinabove, in the multilayer thin film magnetic memory element illustrated in the drawings by applying a bias between the two magnetic films 11 and 12 the magnetic coupling between these films may be altered. It is thus seen that the thin film magnetic memory element illustrated in the drawings provides for magnetic coupling and permits the fabrication of a low creep magnetic device with non-destructive read out.

The multilayer thin film magnetic memory elements prepared in accordance with this invention and capable of variable coupling possesses advantages over other non-destructive read out magnetic memory elements. For example, in a magnetic memory element prepared in accordance with this invention the magnetic vector in magnetic material $M_2$ is capable of rapid change in position and therefore can produce a greater output voltage than other devices which require long periods for rotation of the magnetization vector. Also, the read out of the magnetically stored value in the magnetic memory element is actuated by a voltage source and therefore little current is required, accordingly reducing the possible adverse affects on adjacent memory storage elements. Also, since little current is employed there will be little power dissipation. Further, due to the ability of the magnetization vector of magnetic material $M_2$ to change position quickly, the device of this invention has a high repetition rate and a low cycle time. Also, as clearly indicated hereinabove, the magnetic film memory element of this invention can be operated non-destructively.

The thin film magnetic memory elements of this invention may be prepared with planar films 11, 10 and 12 in the direct superposed relationship indicated in the drawing, or, if desired, films 11, 10 and 12 may be cylindrical in shape in superposed contacting relationship.

Planar and cylindrical form magnetic memory elements in accordance with this invention may be prepared by employing known techniques of vacuum evaporation and deposition, electrodeposition, electroless deposition, in situ formation by chemical reaction and combinations thereof, such as combined electrodeposition and vacuum deposition. For example, a cylindrical form magnetic thin film element in accordance with this invention may be prepared by the electrodeposition onto a wire-form electrically conductive substrate material, such as a copper wire or a beryllium copper wire, a layer of magnetic material, such as Permalloy, a magnetic nickel-iron alloy, so as to form magnetic layer or film 11. There is subsequently deposited on film 11 of magnetic metal, such as by thermal decomposition or cathode sputtering, a layer 10 of semiconductor material. When cathode sputtering is used to deposit semiconductor layer 10, a cylindrical cathode is preferably employed. Layer 12 of magnetic metal, such as a layer of magnetic nickel-iron alloy, is then deposited on semiconductor layer 10 by suitable means, such as by electroless deposition or electrodeposition or the combination of electroless deposition followed by electrodeposition, to yield a magnetic metal film having the desired $H_c$ value, the $H_c$ value being higher or lower than the $H_c$ value of magnetic film 11, but not equal to it.

As indicated hereinabove various materials may be employed to make up magnetic metal films 11 and 12 and semiconductor film 10 interposed therebetween. Suitable such materials for semiconductor film 10 comprise gallium arsenide and cadmium sulfide. Also suitable are the so-called II–VI compounds consisting of elements from Group II and and Group VI of the periodic table, e.g. CdTe, ZnS, ZnTe, etc. Also suitable are some Group III-Group V compounds. Other well known elemental semiconductor materials are also useful and may be employed in the fabrication of devices in accordance with this invention.

In the fabrication of a cadmium sulfide semiconductor layer, cadmium metal may first be electrodeposited and then subjected to in situ chemical reaction with gaseous hydrogen sulfide so as to form resulting cadmium sulfide in situ. Such a technique is useful for the production of a graded film and may provide the required ohmic and blocking contacts.

The thickness of the semiconductor layer in devices in accordance with this invention is about a few hundred angstrom units, such as a thickness in the range 50–1000 A. The thicknesses of the magnetic metal films on both sides of the semiconductor film is also desirably about a few hundred angstroms, such as a thickness in the range 100–10,000 A, although greater thicknesses for one or both of the magnetic metal films may be employed.

What is claimed is:

1. A memory element comprising
   (a) a first film of magnetic material with an easy axis of magnetization in a first orientation;
   (b) a second film of magnetic material with an easy axis of magnetization in a second orientation different from said first orientation; and wherein the material of said first film of magnetic material has a characteristic coercive force of a higher value than the characteristic coercive force of the material of said second film;
   (c) an interposed film of semiconductor material capable of being forward and reverse biased sandwiched between said first and said second films of magnetic material means for applying a forward bias potential between said first and second films of magnetic material sufficient to make said film of semiconductor material electrically conductive and means for applying a reverse bias potential between said first and second films of magnetic material sufficient to make said film of semiconductor material electrically isolating to provide respectively, high degree of magnetic coupling or low degree of magnetic coupling between the magnetic films.

2. A memory element according to claim 1 wherein said first and said second orientations are at an angle to each other of approximately 90°.

3. A memory element according to claim 1 wherein (a) each of the films of magnetic material is magnetized along its easy axis of magnetization;

(b) said second film of magnetic material has characteristic coercive force of a lower value than the characteristic coercive force of said first film of magnetic material;

(c) means are provided for applying an electric potential between the first and the second films of magnetic material of a value sufficient to rotate the orientation of the magnetization of the second film of magnetic material to an orientation different from its original orientation, but by less than the angle resulting in switching the magnetization of said second film of magnetic material to an orientation along its easy axis of magnetization opposite of said original orientation.

4. A memory element according to claim 1 wherein the material for said semiconductor film is selected from the group consisting of cadmium sulfide, gallium arsenide, cadmium telluride, zinc sulfide and zinc telluride.

5. A memory element according to claim 1 wherein said first magnetic film, said second magnetic film and said film of semiconductor material are in the form of concentric curved surfaces.

6. A memory element according to claim 3 wherein said orientation of the magnetization of the second film is at an angle of approximately 60 with respect to its original orientation.

References Cited

UNITED STATES PATENTS

| | | | |
|---|---|---|---|
| 3,195,108 | 7/1965 | Franck | 340—146.2 |
| 3,125,743 | 3/1964 | Pohm et al. | 340—174 |
| 3,375,091 | 3/1968 | Feldtkeller | 29—194 |
| 3,311,901 | 3/1967 | Fedde et al. | 340—174 |
| 3,278,914 | 10/1966 | Rashleigh | 340—174 |
| 3,385,731 | 5/1968 | Weimer | 117—212 |

JOHN W. HUCKERT, Primary Examiner

M. H. EDLOW, Assistant Examiner

U.S. Cl. X.R.

340—174; 307—298